United States Patent
Reed et al.

(10) Patent No.: US 12,333,624 B1
(45) Date of Patent: Jun. 17, 2025

(54) MODULATING SURFACE TOPCOATS TO EMBED DIGITAL WATERMARKING

(71) Applicant: Digimarc Corporation, Beaverton, OR (US)

(72) Inventors: Alastair M. Reed, Lake Oswego, OR (US); Kristyn R. Falkenstern, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 304 days.

(21) Appl. No.: 18/098,667

(22) Filed: Jan. 18, 2023

Related U.S. Application Data

(63) Continuation-in-part of application No. 17/833,683, filed on Jun. 6, 2022, now Pat. No. 11,900,497.

(60) Provisional application No. 63/300,518, filed on Jan. 18, 2022, provisional application No. 63/197,298, filed on Jun. 4, 2021.

(51) Int. Cl.
 *G06T 1/00* (2006.01)
 *B41F 23/08* (2006.01)
 *B41M 3/10* (2006.01)

(52) U.S. Cl.
 CPC .............. *G06T 1/005* (2013.01); *B41F 23/08* (2013.01); *B41M 3/10* (2013.01); *G06T 1/0028* (2013.01); *G06T 2201/0065* (2013.01); *G06T 2201/0202* (2013.01)

(58) Field of Classification Search
 CPC .................. G06T 1/005; G06T 1/0028; G06T 2201/0065; G06T 2201/0202; B41F 23/08; B41M 3/10
 See application file for complete search history.

(56) References Cited

U.S. PATENT DOCUMENTS

| | | |
|---|---|---|
| 5,862,260 A | 1/1999 | Rhoads |
| 5,998,609 A | 12/1999 | Aoki |
| 6,122,403 A | 9/2000 | Rhoads |

(Continued)

FOREIGN PATENT DOCUMENTS

| | | |
|---|---|---|
| EP | 0638614 A1 | 2/1995 |
| EP | 1367810 A2 | 12/2003 |

(Continued)

OTHER PUBLICATIONS

U.S. Appl. No. 17/833,683, filed Jun. 6, 2022. 116 pgs.
U.S. Appl. No. 17/980,471, filed Nov. 3, 2022. 119 pgs.
U.S. Appl. No. 18/098,667, filed Jan. 18, 2023. 55 pgs.

*Primary Examiner* — Christopher Wait
(74) *Attorney, Agent, or Firm* — Klarquist Sparkman, LLP

(57) ABSTRACT

A gloss value of a clear topcoat (e.g., flood of varnish) on a substrate relative to a bare substrate is an indicator of digital watermark robustness for an encoded signal carried by modulating the clear topcoat. This measurement can be used to predict encoded signal robustness prior to printing. One claim is directed to an image processing method comprising: obtaining a first gloss value corresponding to a layer comprising a matte or gloss topcoat flooded over a substrate; obtaining a second gloss value corresponding to the substrate; and determining a relationship between the first gloss value and the second gloss value to determine digital watermark signal robustness of a sparse mark pattern provided on the substrate with the matte or gloss topcoat. Of course, other claims are combinations are described as well.

3 Claims, 16 Drawing Sheets

(56) References Cited

U.S. PATENT DOCUMENTS

| | | |
|---|---|---|
| 6,345,104 B1 | 2/2002 | Rhoads |
| 6,408,082 B1 | 6/2002 | Rhoads |
| 6,449,377 B1 | 9/2002 | Rhoads |
| 6,590,996 B1 | 7/2003 | Reed |
| 6,614,914 B1 | 9/2003 | Rhoads |
| 6,625,297 B1 | 9/2003 | Bradley |
| 6,674,876 B1 | 1/2004 | Hannigan |
| 6,692,031 B2 | 2/2004 | Mcgrew |
| 6,718,046 B2 | 4/2004 | Reed |
| 6,763,123 B2 | 7/2004 | Reed |
| 6,804,377 B2 | 10/2004 | Reed |
| 6,891,959 B2 | 5/2005 | Reed |
| 6,912,295 B2 | 6/2005 | Reed |
| 6,947,571 B1 | 9/2005 | Rhoads |
| 6,993,152 B2 | 1/2006 | Patterson |
| 7,072,490 B2 | 7/2006 | Stach |
| 7,076,082 B2 | 7/2006 | Sharma |
| 7,095,871 B2 | 8/2006 | Jones |
| 7,111,168 B2 | 9/2006 | Lofgren |
| 7,123,740 B2 | 10/2006 | McKinley |
| 7,152,021 B2 | 12/2006 | Alattar |
| 7,340,076 B2 | 3/2008 | Stach |
| 7,352,878 B2 | 4/2008 | Reed |
| 7,372,976 B2 | 5/2008 | Rhoads |
| 7,393,623 B2 | 7/2008 | Conroy |
| 7,412,072 B2 | 8/2008 | Sharma |
| 7,559,983 B2 | 7/2009 | Starling |
| 7,728,048 B2 | 6/2010 | Labrec |
| 7,747,656 B2 | 6/2010 | Kudo |
| 7,892,338 B2 | 2/2011 | Degott |
| 7,927,685 B2 | 4/2011 | Labrec |
| 7,958,359 B2 | 6/2011 | Sharma |
| 7,965,862 B2 | 6/2011 | Jordan |
| 7,980,596 B2 | 7/2011 | Labrec |
| 7,986,807 B2 | 7/2011 | Stach |
| 7,991,186 B2 | 8/2011 | Rudaz |
| 8,002,190 B2 | 8/2011 | Bi |
| 8,041,074 B2 | 10/2011 | Rhoads |
| 8,059,858 B2 | 11/2011 | Brundage |
| 8,083,973 B2 | 12/2011 | Jarvis |
| 8,101,544 B2 | 1/2012 | O'Donoghue |
| 8,101,545 B2 | 1/2012 | Campbell |
| 8,159,657 B2 | 4/2012 | Degott |
| 8,199,969 B2 | 6/2012 | Reed |
| 8,227,637 B2 | 7/2012 | Cohen |
| 8,301,893 B2 | 10/2012 | Brundage |
| 8,308,860 B2 | 11/2012 | Jarvis |
| 8,398,760 B2 | 3/2013 | Jarvis |
| 8,412,577 B2 | 4/2013 | Rodriguez |
| 8,507,178 B2 | 8/2013 | Jarvis |
| 8,557,510 B2 | 10/2013 | Walker |
| 8,606,715 B2 | 12/2013 | Lofgren |
| 8,626,666 B2 | 1/2014 | Lofgren |
| 8,660,298 B2 | 2/2014 | Reed |
| 8,687,839 B2 | 4/2014 | Sharma |
| 8,750,556 B2 | 6/2014 | McKinley |
| 8,753,791 B2 | 6/2014 | Khan |
| 8,825,518 B2 | 9/2014 | Levy |
| 8,840,029 B2 | 9/2014 | Lawandy |
| 8,842,145 B2 | 9/2014 | Cridland |
| 8,900,414 B2 | 12/2014 | Käser |
| 9,117,268 B2 | 8/2015 | Reed |
| 9,182,778 B2 | 11/2015 | Sharma |
| 9,245,308 B2 | 1/2016 | Reed |
| 9,267,042 B2 | 2/2016 | Käser |
| 9,380,186 B2 | 6/2016 | Reed |
| 9,390,345 B2 | 7/2016 | Di Venuto Dayer |
| 9,401,001 B2 | 7/2016 | Reed |
| 9,449,357 B1 | 9/2016 | Lyons |
| 9,475,307 B2 | 10/2016 | Cridland |
| 9,521,291 B2 | 12/2016 | Holub |
| 9,565,335 B2 | 2/2017 | Reed |
| 9,582,844 B2 | 2/2017 | Reed |
| 9,600,754 B2 | 3/2017 | Rodriguez |
| 9,600,951 B2 | 3/2017 | Kisters |
| 9,621,760 B2 | 4/2017 | Rhoads |
| 9,635,378 B2 | 4/2017 | Holub |
| 9,667,829 B2 | 5/2017 | Bai |
| 9,676,220 B2 | 6/2017 | Franken |
| 9,690,967 B1 | 6/2017 | Brundage |
| 9,710,902 B2 | 7/2017 | Di Venuto Dayer |
| 9,727,941 B1 | 8/2017 | Falkenstern |
| 9,747,656 B2 | 8/2017 | Stach |
| 9,749,607 B2 | 8/2017 | Boles |
| 9,754,341 B2 | 9/2017 | Falkenstern |
| 9,805,435 B2 | 10/2017 | Reed |
| 9,864,919 B2 | 1/2018 | Reed |
| 9,892,478 B2 | 2/2018 | Calhoon |
| 9,922,220 B2 | 3/2018 | Evans |
| 9,928,561 B2 | 3/2018 | Filler |
| 10,019,627 B2 | 7/2018 | Kutter |
| 10,032,241 B2 | 7/2018 | Reed |
| 10,065,441 B2 | 9/2018 | Falkenstern |
| 10,074,046 B2 | 9/2018 | Reed |
| 10,181,170 B2 | 1/2019 | Stach |
| 10,217,182 B1 | 2/2019 | Holub |
| 10,235,731 B2 | 3/2019 | Filler |
| 10,255,649 B2 | 4/2019 | Falkenstern |
| 10,270,936 B2 | 4/2019 | Bai |
| 10,282,801 B2 | 5/2019 | Reed |
| 10,304,149 B2 | 5/2019 | Falkenstern |
| 10,304,151 B2 | 5/2019 | Falkenstern |
| 10,332,247 B2 | 6/2019 | Di Venuto Dayer |
| 10,350,926 B2 | 7/2019 | Falkenstern |
| 10,382,645 B2 | 8/2019 | Bai |
| 10,424,038 B2 | 9/2019 | Holub |
| 10,432,818 B2 | 10/2019 | Holub |
| 10,445,849 B1 | 10/2019 | Reed |
| 10,455,112 B2 | 10/2019 | Falkenstern |
| 10,460,161 B1 | 10/2019 | Lauer |
| 10,559,052 B1 | 2/2020 | Reed |
| 10,565,669 B2 | 2/2020 | Filler |
| 10,580,103 B1 | 3/2020 | Falkenstern |
| 10,599,937 B2 | 3/2020 | Reed |
| 10,652,422 B2 | 5/2020 | Bai |
| 10,686,963 B1 | 6/2020 | Rodriguez |
| 10,706,490 B2 | 7/2020 | Calhoon |
| 10,748,232 B2 | 8/2020 | Kamath |
| 10,776,894 B2 | 9/2020 | Stach |
| 10,783,601 B1 | 9/2020 | Rodriguez |
| 10,783,602 B1 | 9/2020 | Reed |
| 10,789,463 B2 | 9/2020 | Kutter |
| 10,872,392 B2 | 12/2020 | Stach |
| 10,880,451 B2 | 12/2020 | Deshmukh |
| 10,896,307 B2 | 1/2021 | Sharma |
| 10,987,960 B2 | 4/2021 | Falkenstern |
| 11,010,857 B2 | 5/2021 | Reed |
| 11,023,992 B2 | 6/2021 | Falkenstern |
| 11,055,805 B1 | 7/2021 | Reed |
| 11,062,418 B2 | 7/2021 | Falkenstern |
| 11,263,829 B2 | 3/2022 | Reed |
| 11,270,404 B2 | 3/2022 | Calhoon |
| 11,276,133 B2 | 3/2022 | Kamath |
| 11,288,764 B2 | 3/2022 | Kamath |
| 11,308,571 B2 | 4/2022 | Holub |
| 11,354,767 B2 | 6/2022 | Reed |
| 11,361,178 B2 | 6/2022 | Lin |
| 11,386,281 B2 | 7/2022 | Boles |
| 11,386,517 B2 | 7/2022 | Filler |
| 11,410,261 B2 | 8/2022 | Stach |
| 11,568,165 B1 | 1/2023 | Alattar |
| 2003/0186001 A1 | 10/2003 | Khan |
| 2006/0040217 A1 | 2/2006 | Stubbs |
| 2006/0165311 A1 | 7/2006 | Watson |
| 2008/0124498 A1 | 5/2008 | Cole |
| 2008/0277626 A1 | 11/2008 | Yang |
| 2008/0286483 A1 | 11/2008 | Khan |
| 2008/0305328 A1 | 12/2008 | Green |
| 2008/0318154 A1 | 12/2008 | Wyres |
| 2009/0023585 A1 | 1/2009 | Wyres |
| 2009/0117353 A1 | 5/2009 | Stubbs |
| 2009/0128615 A1 | 5/2009 | Miller |
| 2009/0191420 A1 | 7/2009 | O'Donoghue |
| 2009/0214835 A1 | 8/2009 | Campbell |

(56) References Cited

U.S. PATENT DOCUMENTS

| | | |
|---|---|---|
| 2009/0220749 A1 | 9/2009 | O'Donoghue |
| 2009/0221422 A1 | 9/2009 | Miller |
| 2010/0015558 A1 | 1/2010 | Jarvis |
| 2010/0075848 A1 | 3/2010 | Khan |
| 2010/0104825 A1 | 4/2010 | Campbell |
| 2010/0150434 A1 | 6/2010 | Reed |
| 2010/0279079 A1 | 11/2010 | Campbell |
| 2010/0310787 A1 | 12/2010 | Lehmann |
| 2011/0148092 A1 | 6/2011 | Jarvis |
| 2011/0274893 A1 | 11/2011 | Kaeser |
| 2012/0065313 A1 | 3/2012 | Demartin |
| 2012/0078989 A1 | 3/2012 | Sharma |
| 2013/0329006 A1 | 12/2013 | Boles |
| 2014/0052555 A1 | 2/2014 | MacIntosh |
| 2014/0127429 A1 | 5/2014 | Jarvis |
| 2015/0156369 A1 | 6/2015 | Reed |
| 2015/0361289 A1 | 12/2015 | Campbell |
| 2016/0168407 A1 | 6/2016 | Jarvis |
| 2016/0275326 A1* | 9/2016 | Falkenstern ......... G07D 7/0034 |
| 2016/0275639 A1 | 9/2016 | Holub |
| 2017/0193628 A1 | 7/2017 | Sharma |
| 2019/0171856 A1 | 6/2019 | Sharma |
| 2019/0332840 A1 | 10/2019 | Sharma |
| 2021/0110505 A1 | 4/2021 | McMahan, Jr. |
| 2021/0112175 A1 | 4/2021 | McMahan, Jr. |
| 2021/0299706 A1 | 9/2021 | Filler |
| 2022/0331841 A1 | 10/2022 | Filler |

FOREIGN PATENT DOCUMENTS

| | | |
|---|---|---|
| EP | 1370062 A1 | 12/2003 |
| WO | 9953428 | 10/1999 |
| WO | 0007356 | 2/2000 |
| WO | 2015077493 A1 | 5/2015 |
| WO | 2019165364 | 8/2019 |
| WO | 2021195563 | 9/2021 |

* cited by examiner

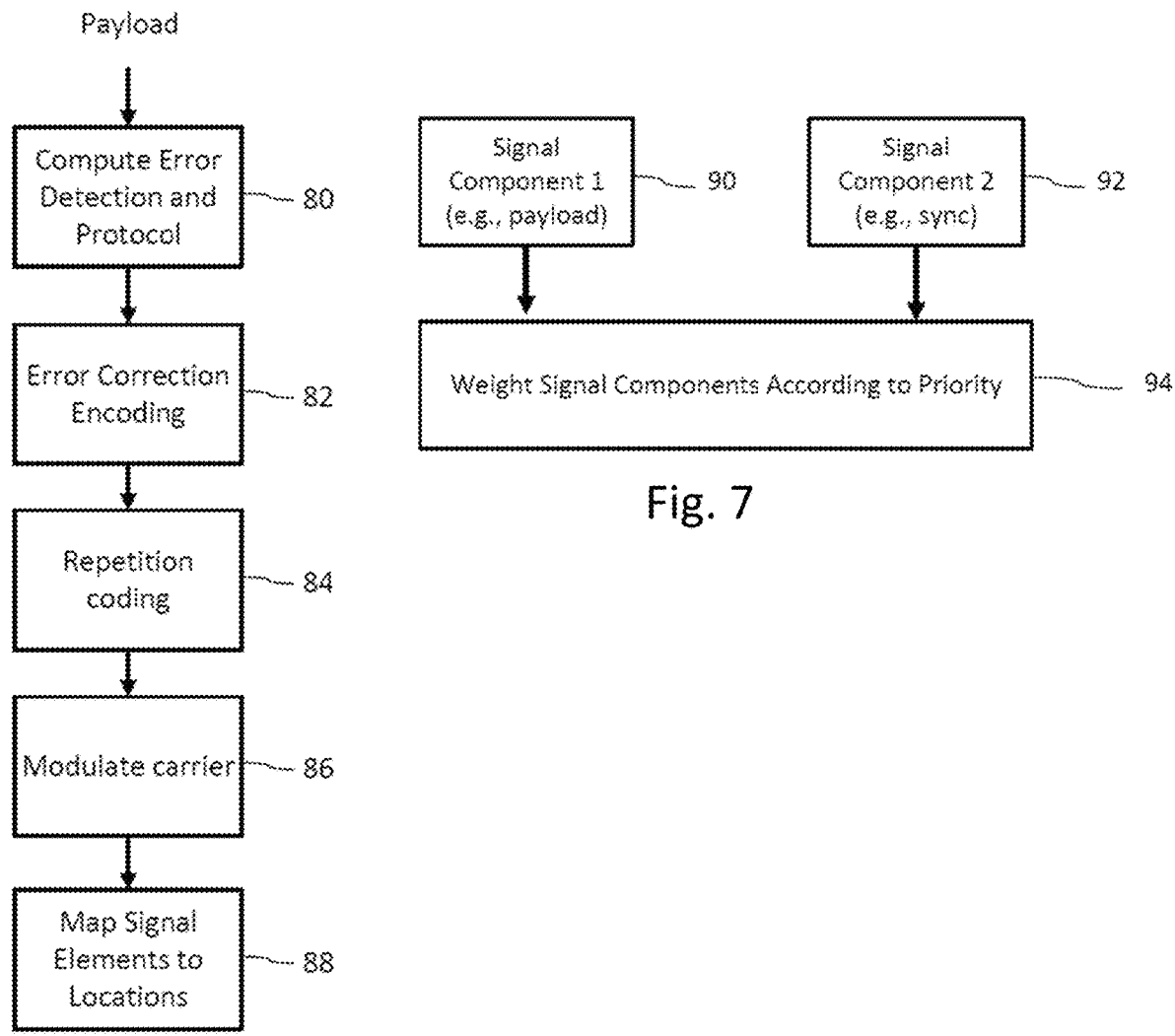

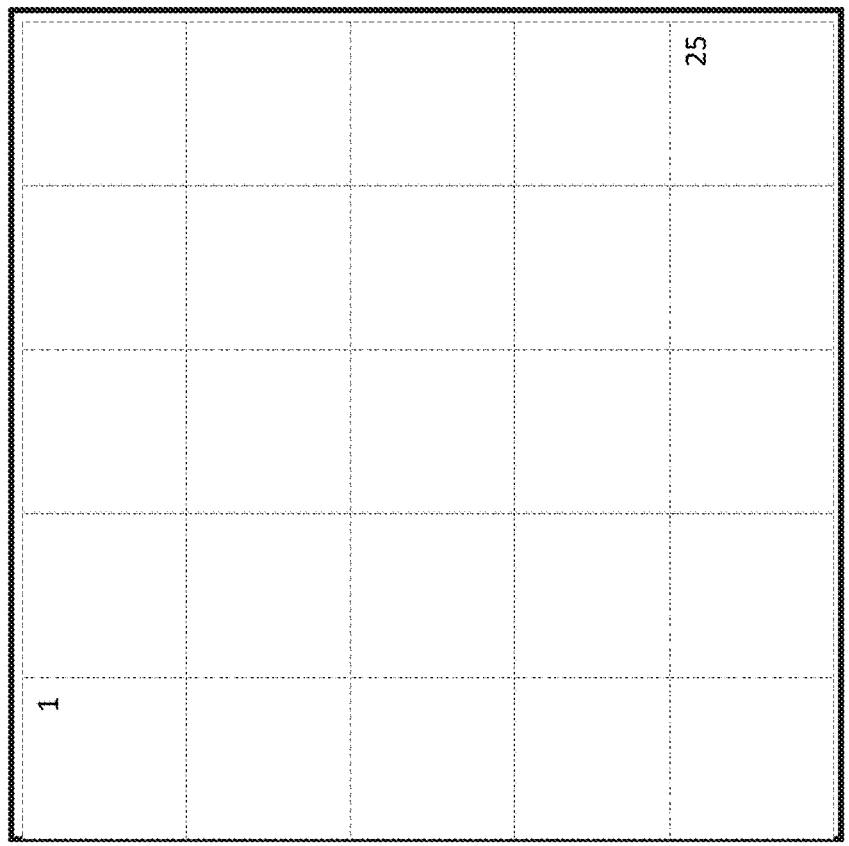
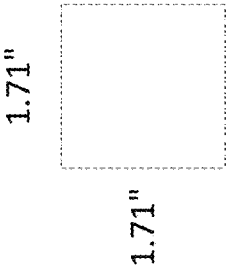
Fig. 8
- 5x5 cells = 8.55" x 8.55"

FIG. 11
FIG. 12
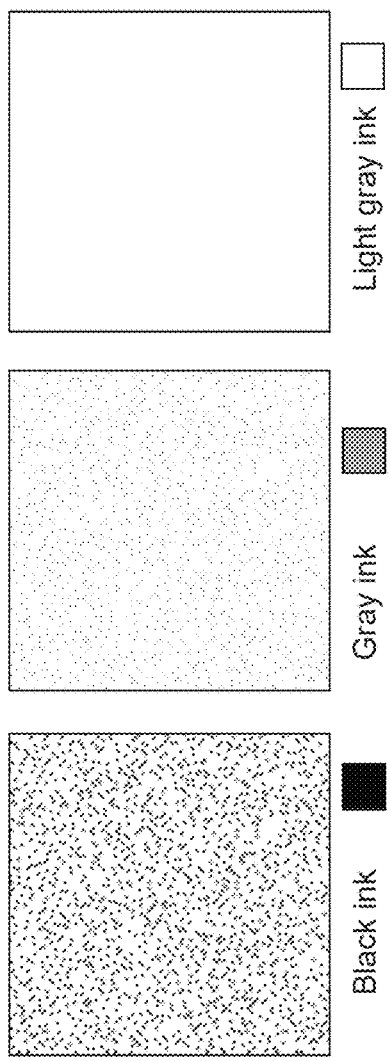
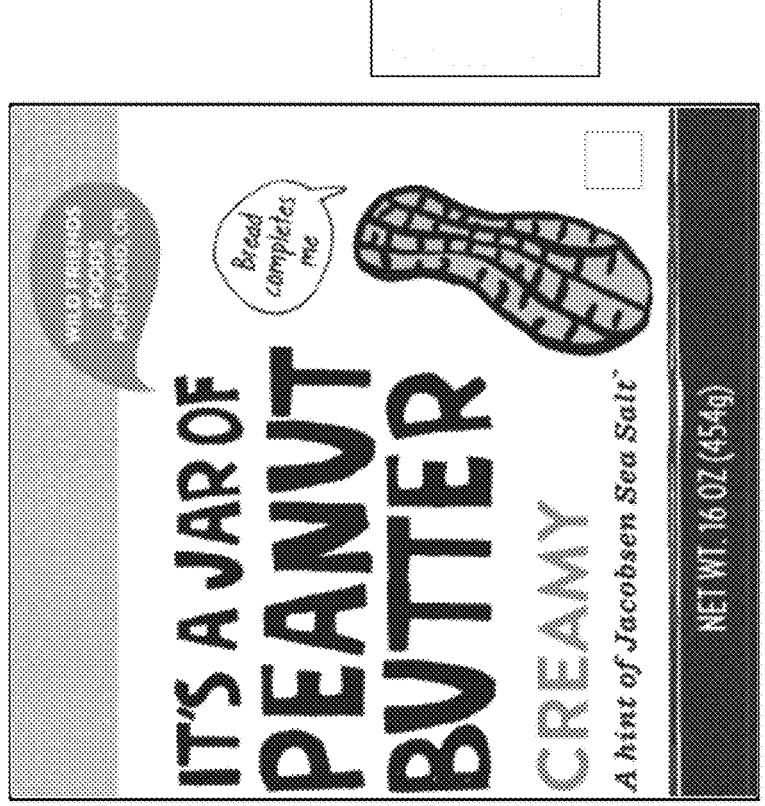

| Treatment | Substrate | Black | PMS 185 | PMS 2685 | PMS 286 | PMS 349 | Yellow |
|---|---|---|---|---|---|---|---|
| Gloss Contrast | 11 | 11 | 11 | 12 | 12 | 10 | 10 |

FIG. 20

MODULATING SURFACE TOPCOATS TO EMBED DIGITAL WATERMARKING

RELATED APPLICATION DATA

This application is a continuation in part of U.S. patent application Ser. No. 17/833,683, filed Jun. 6, 2022, which claims the benefit of U.S. Provisional Patent Application No. 63/197,298, filed Jun. 4, 2021. This application also claims the benefit of U.S. Provisional Patent Application No. 63/300,518, filed Jan. 18, 2022. This application is generally related to assignee's U.S. patent application Ser. No. 17/980,471, filed Nov. 3, 2022. Each of the above-mentioned patent documents is hereby incorporated herein by reference.

TECHNICAL FIELD

The present disclosure relates generally to advanced image signal processing involving signal encoding. Predictive models can be used to determine robustness of digital watermarking signals carried by clear topcoats (e.g., varnish, gloss or lacquers). Using a hand-held gloss meter, gloss contrast values can be measured and used in a predictive model to estimate encoded signal robustness.

BACKGROUND AND SUMMARY

One form of signal encoding is digital watermarking. For purposes of this disclosure, the terms "digital watermark," "watermark," "data encoding" and "data hiding" are used interchangeably. We sometimes use the terms "encoding," "encode," "embedding," "embed," and "data hiding" to mean modulating (or transforming) data or physical surfaces to include information therein. For example, data encoding embeds an information signal (e.g., a plural bit payload or a modified version of such, e.g., a 2-D error corrected, spread spectrum signal) in a host signal. This can be accomplished, e.g., by modulating a host signal (e.g., image, video or audio) in some fashion to carry the information signal. The modulated signal can then be printed onto a surface or used to guide a relief forming process.

Some of Digimarc Corporation's work in signal encoding, data hiding, and digital watermarking is reflected, e.g., in U.S. Pat. Nos. 6,947,571; 6,912,295; 6,891,959, 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by Aspects, features, combinations and technology will be readily apparent from the following description with reference to the accompanying drawings.

BRIEF DESCRIPTION OF THE DRAWINGS

FIG. 6 is a flow diagram illustrating operations of a signal generator.

FIG. 7 is a diagram illustrating a method of weighting elements of a raw data signal.

FIG. 8 shows a surface with 25 raw data signal tiles provided thereon.

FIG. 11 shows different sparse marks printed with different ink.

FIG. 12 shows a sparse mark pattern printed with PMS 9520.

FIG. 20 is a table showing different Gloss Value for different inks overprinted with matte varnish.

DETAILED DESCRIPTION

Introduction

The following detailed description is divided into three (3) general sections. It should be understood from the outset, however, that we expressly contemplate combining subject matter from one such section with one or more of the other sections. Thus, the sections and section headings are provided for the reader's convenience and are not intended to impose restrictions or limitations. The sections include: I. Signal Encoder and Decoder; II. Modulating Surface Topcoat to Embed Digital Watermarking; and III. Operating Environments.

I. Signal Encoder and Decoder

Encoder/Decoder

Figure 1:
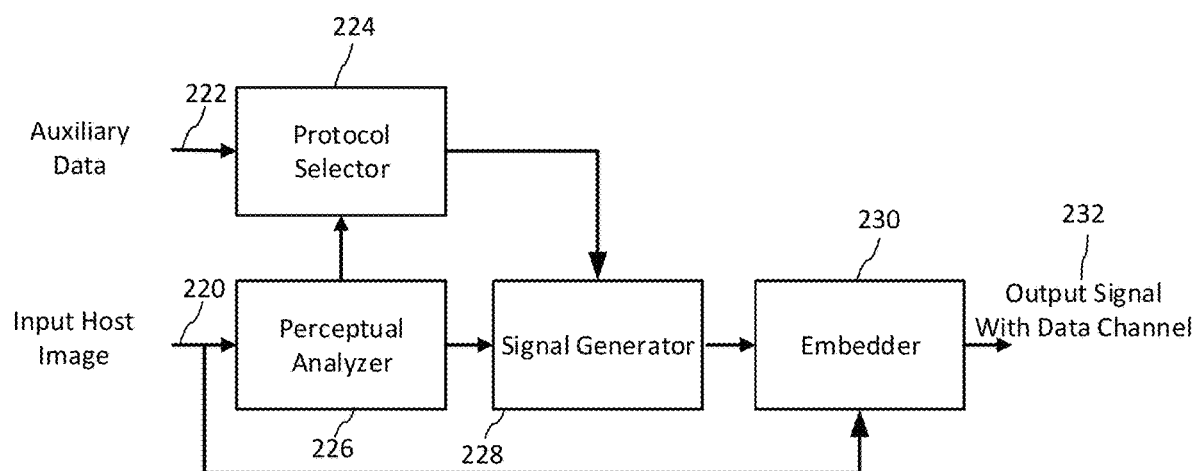
FIG. 1 is a block diagram of a signal encoder for encoding a digital payload signal into an image signal.
Figure 2:
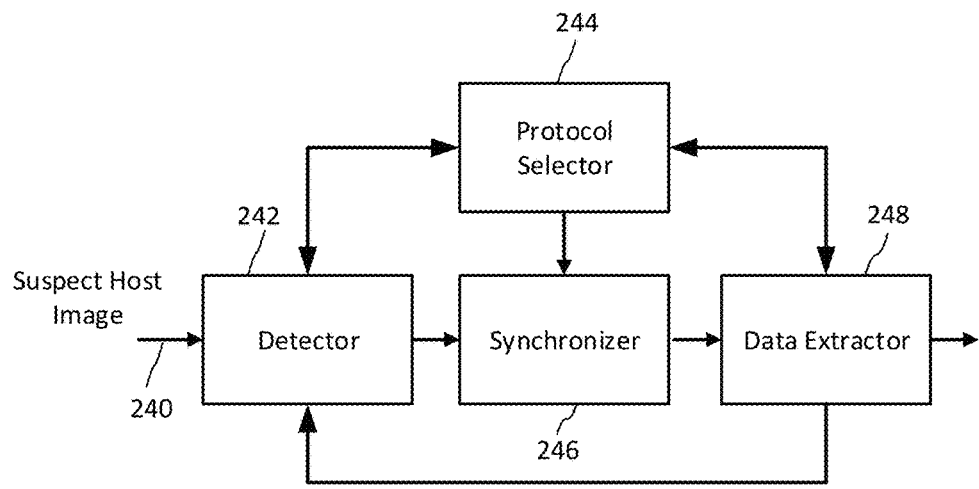
FIG. 2 is a block diagram of a compatible signal decoder for extracting the digital payload signal from an image signal.

FIG. 1 is a block diagram of a signal encoder for encoding a digital payload signal into an image signal. FIG. 2 is a block diagram of a compatible signal decoder for extracting the digital payload signal from an image signal.

While the signal encoder and decoder may be used for communicating a data channel for many applications, one objective for use in physical objects is robust signal communication through images formed on and captured from these objects. Signal encoders and decoders, like those from Digimarc Corporation, communicate auxiliary data in a data carrier within image content. Encoding and decoding is applied digitally, yet the signal survives digital to analog transformation and analog to digital transformation. For example, the encoder generates a modulated digital image that is converted to a rendered form, such as a printed image.

The modulated digital image includes the encoded signal prior to rendering. Prior to decoding, a receiving device has or communicates with an imager to capture the modulated signal, convert it to an electric signal, which is digitized and then processed by the FIG. 2 signal decoder.

Inputs to the signal encoder include a host image 220 and auxiliary data payload 222. The objectives of the encoder include encoding a robust signal with desired payload capacity per unit of host signal (e.g., a unit may include the spatial area of a two-dimensional tile within the host signal), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., U.S. Pat. No. 9,635,378, incorporated herein by reference in its entirety.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and/or synchronization method and signals.

The protocol defines the manner in which the signal is structured and encoded for robustness, perceptual quality and/or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 256 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., the visibility and color model technology used in perceptual analysis in U.S. Pat. Nos. 7,352,878, 9,117,268, 9,380,186, 9,401,001 and 9,449,357, which are hereby incorporated by reference in their entirety.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and/or available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator 228 produces a data signal with data elements that are mapped to embedding locations in an image tile. These data elements are modulated onto the host image at the embedding locations. A tile may include a pattern of embedding locations. The tile derives its name from the way in which it is repeated in contiguous blocks of a host signal, but it need not be arranged this way. In image-based encoders, we may use tiles in the form of a two-dimensional array (e.g., 128×128, 256×256, 512×512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again, please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. Pat. No. 9,449,357; and see also, U.S. Pat. Nos. 9,401,001 and 9,565,335, which are each hereby incorporated by reference in its entirety.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., U.S. Pat. Nos. 7,352,878, 9,117,268, 9,380,186, 9,401,001 and 9,449,357, US A1, already incorporated herein.

The Embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., U.S. Pat. Nos. 9,380,186, 9,401,001 and 9,449,357 for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the Embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 2, the signal decoder receives an encoded host signal 240 and operates on it with one or more processing stages to detect a data signal, synchronize it, and extract data.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules can be implemented as software instructions executed within an image scanner or camera, an FPGA, or ASIC, etc.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 3:
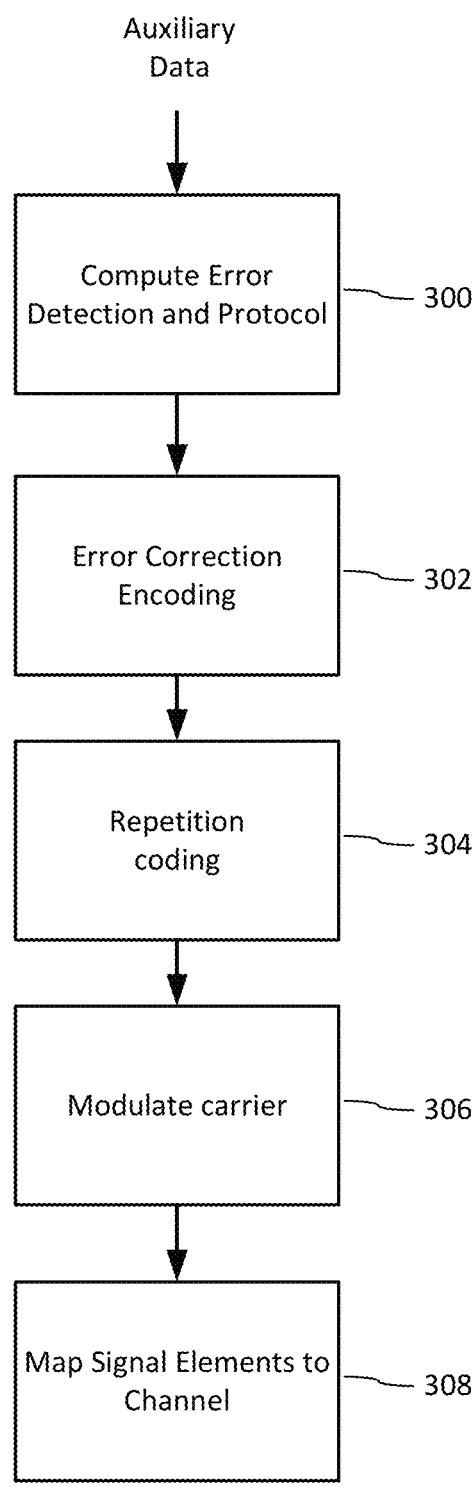
FIG. 3 is a flow diagram illustrating operations of a signal generator.

FIG. 3 is a flow diagram illustrating operations of a signal generator. Each of the blocks in the diagram depict processing modules that transform the input auxiliary data into a digital payload data signal structure. The input auxiliary data may include, e.g., a Global Trade Item Number (GTIN) developed by GS1. For example, the GTIN may be structured in the GTIN-12 format for UPC codes. Of course, the input auxiliary data may represent other plural bit codes as well. For a given protocol, each block provides one or more processing stage options selected according to the protocol. In processing module 300, the auxiliary data payload is processed to compute error detection bits, e.g., such as a Cyclic Redundancy Check (CRC), Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (1/3 rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform, such as sine wave or orthogonal array. In the case of positive and negative elements, the payload signal is a form of binary antipodal signal. It also may be formed into a ternary (of 3 levels, −1, 0, 1) or M-ary signal (of M levels). These carrier signals may be mapped to spatial domain locations or spatial frequency domain locations. Another example of carrier signals are sine waves, which are modulated using a modulation scheme like phase shifting, phase quantization, and/or on/off keying. In one embodiment, carrier modulation module XORs each bit of a scrambled signature with a string of 16 binary elements (a "spreading key"), yielding 16 "chips" having "0" and "1" values. If error correction encoding yields a signature of 1024 bits (which can then be randomized), then the carrier modulation module 306 produces 16,384 output chips.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder extracts estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in U.S. Pat. Nos. 6,614,914, and 5,862,260, which are each hereby incorporated herein by reference in their entirety.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

U.S. Pat. No. 9,182,778, which is hereby incorporated by reference in its entirety, provides additional methods for detecting an embedded signal with this type of structure and recovering rotation, scale and translation from these methods.

Examples of implicit synchronization signals, and their use, are provided in U.S. Pat. Nos. 5,862,260, 6,614,914, 6,625,297, 7,072,490, 9,747,656, which are hereby incorporated by reference in their entirety.

Signal Embedding in Host

Figures 4, 5:
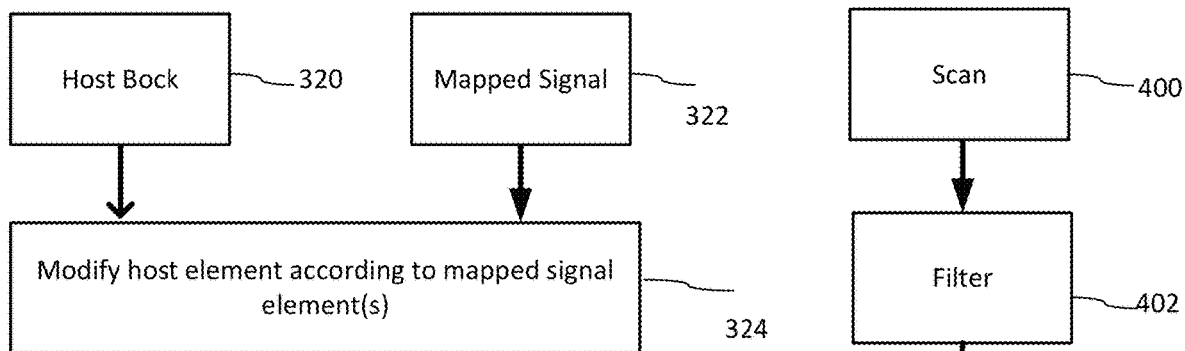
FIG. 4 is a diagram illustrating embedding of an auxiliary signal into host image signal.
FIG. 5 is a flow diagram illustrating a method for decoding a payload signal from a host image signal.

FIG. 4 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added or added separately with separate mask coefficients to control the signal amplitude independently.

Following the construction of the payload, error correction coding is applied to the binary sequence. This implementation applies a convolutional coder at rate ¼, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in U.S. patent application Ser. No. 14/724,729 (issued as U.S. Pat. No. 7,747,656). In the latter, the tile size may be increased to accommodate the differential encoding of each encoded bit in a pattern of differential encoded bit cells, where the bit cells corresponding to embedding locations at a target resolution (e.g., 300 DPI).

U.S. Pat. No. 9,635,378 describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in U.S. Pat. Nos. 6,614,914, 5,862,260, and 6,674,876, which are hereby incorporated by reference, and U.S. Pat. Nos. 9,117,268 and 9,635,378, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits. These bits are modulated onto a pseudo-random carrier to produce watermark signal elements (block 306 of FIG. 3), which in turn, are assigned to the pseudorandom embedding locations within the sub-blocks (block 308 of FIG. 3). An embedder module modulates this signal onto a host signal by increasing or decreasing host signal values at these locations for each error correction coded bit according to the values of the corresponding elements of the modulated carrier signal for that bit.

FIG. 5 is a flow diagram illustrating a method for decoding a payload signal from a host image signal. The frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see U.S. Pat. No. 9,521,291, which is hereby incorporated by reference.

Please also see U.S. Pat. No. 9,922,220, which is hereby incorporated by reference, for more on block selection where processing time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268, which is hereby incorporated herein by reference in its entirety, for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in U.S. Pat. No. 9,749,607, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, and 9,182,778, which are hereby incorporated by reference in their entirety.

For more on filters, also see U.S. Pat. No. 7,076,082, which is hereby incorporated by reference in its entirety. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of U.S. Pat. No. 9,182,778, to recover rotation and scale of a synchronization signal comprised of peaks in the Fourier domain. To recover translation, the phase correlation method of U.S. Pat. No. 6,614,914 is used, or phase estimation and phase deviation methods of U.S. Pat. No. 9,182,778 are used.

Alternative methods perform synchronization on an implicit synchronization signal, e.g., as detailed in U.S. Pat. No. 9,747,656.

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct-axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

Technology for so-called "sparse" mark encoding (also called "binary" mark encoding), e.g., encoding with variable density to adapt for visual quality and reliability, is described in, e.g., Digimarc's US Published Patent Application Nos. US 2016-0275639 A1, US 2019-0171856 A1, and US 2019-0332840 A1, and PCT international patent application no. PCT/US19/19410, filed Feb. 25, 2019 (published as WO 2019/165364), each of which is hereby incorporated herein by reference in its entirety. A sparse mark may include a pattern of spatial locations where ink is deposited or not (or where an area is engraved or not). For example, a sparse signal may be comprised of ink dots on a light background, such that the signal forms a pattern of subtly darker spatial locations. The signal is designed to be sparse by the spacing apart of the darker locations on the light background. Conversely, the signal may be designed as an array of lighter "holes" on a relatively darker background. In still other cases, the signal may include a pattern of both darker and lighter signal elements.

Further Encoding

Initially, let us drill down into some further encoding details.

FIG. 6 is a flow diagram illustrating operations of a signal generator. This signal generator may be used to generate raw data signal tiles. Each of the blocks in the diagram depict processing modules that transform the input payload data into a data signal structure. For a given data signal protocol, each block provides one or more processing stage options selected according to the protocol. In processing module 80, the data payload is processed to compute error detection bits, e.g., such as a Cyclic Redundancy Check, Parity, check sum or like error detection message symbols. Additional fixed and variable messages used in identifying the protocol and facilitating detection, such as synchronization signals may be added at this stage or subsequent stages.

Error correction encoding module 82 transforms the message symbols into an array of encoded message elements (e.g., binary or M-ary elements) using an error correction method. Examples include block codes, BCH, Reed Solomon, convolutional codes, turbo codes, etc.

Repetition encoding module 84 repeats the string of symbols from the prior stage to improve robustness. Repetition encoding may be removed and replaced entirely with error correction coding. For example, rather than applying convolutional encoding (e.g., at 1/3 rate) followed by repetition (repeat three times), these two can be replaced by convolution encoding to produce a coded payload with approximately the same length.

Next, carrier modulation module 86 takes message elements of the previous stage and modulates them onto corresponding carrier signals. For example, a carrier might be an array of pseudorandom signal elements, with equal number of positive and negative elements (e.g., 16, 32, 64 elements), or other waveform. In the case of positive and negative elements, the payload signal is in the form of a binary antipodal signal. It also may be formed into a ternary (of 3 levels, −1, 0, 1) or M-ary signal (of M levels).

Mapping module 88 maps signal elements of each modulated carrier signal to locations. These may be spatial locations with a tile. They may also be spatial frequency locations. In this case, the signal elements are used to modulate frequency domain values (such as magnitude or phase). The resulting frequency domain values are inverse transformed into the spatial domain to create a raw data signal tile in the spatial domain.

Mapping module 88 also maps a synchronization signal to locations. These locations may overlap or not the locations of the payload. The encoded payload and synchronization signal are signal components that are weighted and together, form the raw data signal of a tile. Unless specifically noted otherwise, we use the term "raw data signal" to include both an encoded payload and a synchronization signal, perhaps in a weighted or prioritized fashion.

To accurately recover the payload, a reader extracts estimates of the coded data signal at their locations within a tile. This requires the reader to synchronize the image under analysis to determine the tile locations, and data element locations within the tiles. The locations are arranged in two dimensional blocks forming each tile. The synchronizer determines rotation, scale and translation (origin) of each tile.

The raw data signal tile comprises an explicit and/or implicit synchronization signal. An explicit synchronization signal is a signal component separate from the encoded payload that is included with the encoded payload, e.g., within the same tile. An implicit synchronization signal is a signal formed with the encoded payload, giving it structure that facilitates geometric synchronization. Examples of explicit and implicit synchronization signals are provided in our U.S. Pat. Nos. 6,614,914, and 5,862,260.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our US Publication Nos. 20120078989 and 20170193628, which are each hereby incorporated by reference, provide additional methods for detecting a reference signal with this type of structure and recovering rotation, scale and translation. US 20170193628 provides additional teaching of synchronizing a reader and extracting a digital payload with detection filters, even where there is perspective distortion.

Examples of implicit synchronization signals, and their use, are provided in U.S. Pat. Nos. 6,614,914, 5,862,260, 6,625,297, 7,072,490, and 9,747,656, which are hereby incorporated by reference.

Applying the method of FIG. 6, the payload is formatted into a binary sequence, which is encoded and mapped to the locations of a tile. For illustration, we describe an implementation of an N by M array of bit cells. The parameters, N and M are integers, and the tile is comprised of an N by M array of bit cells. The size of the tile is configurable and depends on application requirements, such as payload capacity per unit area, robustness, and visibility. Payload capacity increases per unit area with the increase in bit cells per unit area. This additional capacity may be used to improve robustness by redundantly encoding the payload in plural bit cells. Visibility tends to decrease with higher spatial resolution (higher spatial density of bit cells), as the HVS (Human Visual System) is less sensitive to changes at higher spatial frequencies. Examples of bit cell array sizes include 64 by 64, 128 by 128, 256 by 256 and 512 by 512. While each of these is square and has a dimension that is power of 2, the tile need not be so limited. The bit cells correspond to spatial locations within a tile. In particular, the spatial locations correspond to pixel samples at a configurable spatial resolution, such as 75-600 DPI (dots per inch). The payload is repeated in contiguous tiles of artwork. An instance of the payload is encoded in each tile, occupying a block of artwork having a size that depends on the number of bit cells per tile and the spatial resolution. The tile is redundantly encoded in several contiguous tiles, providing added robustness, as the detector accumulates signal estimates for a payload across tiles. Additionally, the entire payload may be extracted from a portion of a tile in configurations where it is redundantly encoded in sub-tile regions.

A few examples will help illustrate the parameters of a tile. The spatial resolution of the bit cells in a tile may be expressed in terms of cells per inch (CPI). This notation provides a convenient way to relate the bit cells spatially to pixels in an image, which are typically expressed in terms of dots per inch (DPI). Take, for example, a bit cell resolution of 75 CPI. When a tile is encoded into an image with a pixel resolution of 300 DPI, each bit cell corresponds to a 4 by 4 array of pixels in the 300 DPI image. As another example, each bit cell at 150 CPI corresponds to a region of 2 by 2 pixels within a 300 DPI image and a region of 4 by 4 pixels within a 600 DPI image. Now, considering tile size in terms of N by M bit cells and setting the size of a bit cell, we can express the tile size by multiplying the bit cell dimension by the number of bit cells per horizontal and vertical dimension of the tile. Below is a table of examples of tile sizes in inches for different CPI and number of bit cells, N in one dimension. In this case, the tiles are square arrays of N by N bit cells.

TABLE 1

Examples of tile sizes for different CPI and number of bit cells

| Tile Size (N) | Examples of Tile Size for Different Cells Per Inch (CPI) | | | | | |
|---|---|---|---|---|---|---|
| | 75 | 100 | 120 | 150 | 300 | 600 |
| 32 | 0.43 | 0.32 | 0.27 | 0.21 | 0.11 | 0.05 |
| 64 | 0.85 | 0.64 | 0.53 | 0.43 | 0.21 | 0.11 |
| 128 | 1.71 | 1.28 | 1.07 | 0.85 | 0.43 | 0.21 |
| 256 | 3.41 | 2.56 | 2.13 | 1.71 | 0.85 | 0.43 |
| 512 | 6.83 | 5.12 | 4.27 | 3.41 | 1.71 | 0.85 |

These examples illustrate that the tile size varies with bit cells per tile and the spatial resolution of the bit cells. These are not intended to be limiting, as the developer may select the parameters for the tile based on the needs of the application, in terms of data capacity, robustness and visibility.

There are several alternatives for mapping functions to map the encoded payload to bit cell locations in the tile. In one approach, prioritized signal components from the above optimization process are mapped to locations within a tile. In another, they are mapped to bit cell patterns of differentially encoded bit cells as described in U.S. Pat. No. 9,747,656, incorporated above. In the latter, the tile size may be increased to accommodate the differential encoding of each encoded bit in a pattern of differential encoded bit cells, where the bit cells corresponding to embedding locations at a target resolution (e.g., 300 DPI).

For explicit synchronization signal components, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the tile.

This signal component is weighted according to the priority relative to the payload component as discussed below.

The generation of artwork from the raw data signal results in loss of data signal. This occurs because the transformations remove or distort portions of a dense data signal tile. For instance, as sparsity of graphical elements increases with thresholding, skeletonizing, and editing the skeletal representation, data signal elements are removed or altered, which reduces robustness. This reduces the capacity of the data channel in a given tile region of the artwork. In some cases, there can be contention between allocation of the remaining data channel to components of the data signal, such as the synchronization and payload components. In our U.S. Pat. No. 9,635,378, incorporated herein by reference in its entirety, we discuss ways to allocate a sparse data channel to components of a data signal, including synchronization and payload components. These methods of generating a sparse data signal may be used in the above techniques in which graphical objects are positioned at the location of sparse signal within a tile.

Incorporating the data signal into artwork also impacts the prioritization of signal components in the data channel of the artwork. This occurs because the artwork can interfere differently with the signal components. In addition, the amount of signal capacity dedicated to synchronization and payload to achieve reliable detection varies with the artwork design. Thus, the ratio of the signal components should be adapted for the artwork.

Here we discuss strategies for prioritizing signal components to counteract loss of robustness. FIG. 7 is a diagram illustrating a method of weighting elements of a raw data signal. The signal generator produces signal components. These include components that carry a subset of the payload bits (90) and components that provide synchronization (92). In block 94, the signal generator weights the components according to their priority. This priority is then used in the artwork generation to control which of the data signal elements are retained.

In one approach for adapting artwork to carry signals, the above process for editing the artwork is executed with different weightings for the payload and synchronization components for a candidate artwork design and editing strategy. This yields several variants of the artwork carrying the data signal. Additional permutations of each variant are then generated by distorting the artwork according to image shifts, rotation angles, reducing and enlarging spatial scale, noise addition and blur. Robustness measures based on both correlation with a reference signal for synchronization and correlation with the message signal are computed and stored for each artwork variant. Additionally, the reader is executed on each variant to determine whether it successfully decodes the payload. The component weighting and robustness metric thresholds are then derived by analyzing the distribution of ratio of components that lead to successful payload decoding. The distribution illustrates which ratios and robustness metric values are required to lead to reliable detection. These ratios and robustness metrics are then used for the candidate artwork design and signal encoding method in an automated data encoding program.

Another approach optimizes the data signal in sparse artwork. To be compatible with sparse artwork, the data signal is also sparse, and is structured to be consistent with the sparse artwork. Sparse data signals can be binary (0,1), trinary (−1, 0, 1), or other coarse quantization. Sparse signals are assumed to be low density, e.g., less than 50% ink or less than 50% space. Since the signal has maximum robustness at 50%, any optimal sparse algorithm should increase in robustness as the ink/space density tends toward 50%. Sparse signals maintain robustness by using thresholds to create binary or trinary signals. These binary or trinary signals ensure that the detection filter will return a maximum value at desired signal locations. Between the sparse locations in the artwork, the detection filter will output a Gaussian distribution between maximum negative and positive outputs due to random noise introduced by the image capture (namely, scanner or camera noise). The Gaussian width depends on the amount of blur included in the image capture processing.

During optimization of sparse signals, a small amount of filtered noise can be added to account for the fact that the detection filter will create non-zero values everywhere due to noise of the image capture device. The optimization parameters for sparse signals include synchronization signal to payload signal weighting and thresholds. There is a single threshold for sparse signals. It is a negative threshold for low ink density, <50%, and a positive threshold for high ink density, >50% (e.g., unprinted dots surrounded by a dark background). There is a dual positive and negative threshold for trinary signals. The robustness objective is the same for dense and sparse signals. Namely, it is a detection robustness over the targeted workflow environment, which is modeled with distortions to the encoded artwork.

II. Modulating Surface Clear Topcoats to Embed Digital Watermark Signals

This Section II describes, e.g., modulating surface clear topcoats (e.g., gloss, varnish, lacquer or other clear topcoat) to embed digital watermark signals. In some cases, a handheld gloss meter can be used to measure press print and accurately predict a scanner gray value. Additionally, when possible, a gloss meter can be used on press to confirm the watermark robustness.

Digital watermarking technology provided by the assignee, Digimarc Corporation, is currently being used in the retail and packaging industry, and by major brands. In the retail and packaging industry, substrates such as paper, opaque plastic, and foil with a flood of white ink can be used.

We have found that digital watermarking detection rates can be predicted using a 45/0 spectrophotometer to measure ink contrast. These spectrophotometers are widely used in the printing industry and are one method that is used on press for confirming the predicted robustness of digital watermarking. Signal encoding and robustness prediction is discussed, e.g., in U.S. Pat. Nos. 9,690,967 and 10,217,182, and in published US Patent Application No. US 2021-0110505 A1, which are each hereby incorporated herein by reference in its entirety.

Digimarc is extending the use of its digital watermark technology to the recycling industry. The recycling industry application requires digital watermarking to be applied to a larger range of substrates than in the retail and packaging industry. Two substrates that are widely used in the recycling industry and that were not previously supported are, bare plastic bottles (plastic bottles without labels) and bare foil (foil without a flood of white ink). Some of our work in watermarking for recycling is found in, e.g., U.S. patent application Ser. No. 17/214,455, filed Mar. 26, 2021 (published as US 2021-0299706 A1), and published US Patent Application No. 2022-0331841 A1, and PCT international patent application No. PCT/US21/24483, filed Mar. 26, 2021 (published as WO 2021/195563), each of which is hereby incorporated here by reference in its entirety.

A few observations:
1. Bare plastic bottles have digital watermarking applied using various types of plastic blow mold techniques to introduce a texture which carries the watermark signal.
2. A bare foil substrate can include digital watermarking that applied using a binary watermark printed with solid ink or varnishes to introduce a texture. Digimarc's Binary Mark watermarking technology (also called "sparse mark" watermarking technology) is described in, e.g., US 2016-0275639 A1, US 2019-0171856 A1, and US 2019-0332840 A1, and in WO 2019/165364, and in U.S. patent application Ser. No. 16/849,288, filed Apr. 15, 2020 (U.S. Pat. No. 11,568,165), each of these patent documents is hereby incorporated herein by reference in its entirety including all drawings and any appendices. Additional examples of so-called sparse marks are shown in FIG. 11, in differing shades of ink. FIG. 12 shows an exploded view of a spark mark printed with a spot color ink, PMS 9520.

In both these cases 1 and 2, above, the highest contrast seen by commercial capture devices is in the specular region.

We would like to predict the robustness of the digital watermarking on these substrates, for commonly used capture devices such as recycling scanners, mobile phones and Point of Sale Scanners.

Figure 13:
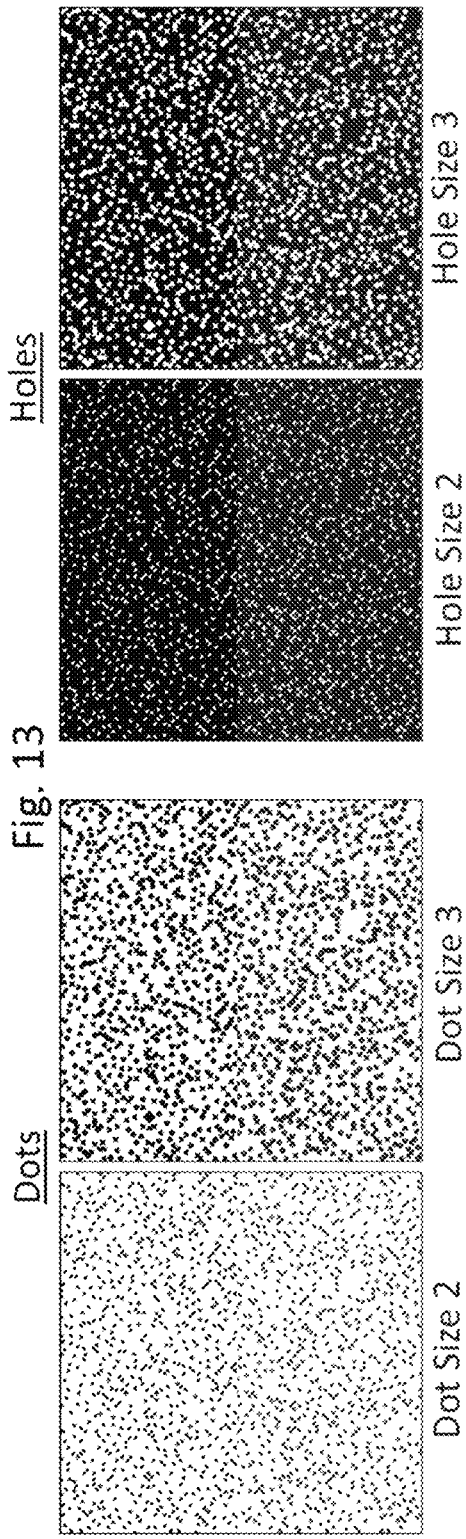
FIG. 13 shows sparse mark patterns with different dot or hole sizes.

There are advantages to modulating clear topcoats, e.g., a varnish, to carry a sparse mark signal. For example, a varnish does not affect package color, it typically only affects the "glossiness" of a covered package area. Varnish can also be applied to a substrate using dots or holes. (For example, please see FIG. 13, where four different density sparse mark patterns are illustrated using matte and gloss varnish, together with a region with 0% varnish and 100% varnish. The black regions in these printed images contain varnish and the white does not. The larger the dot size, the larger the hole or dot. In this example, dot size 3 includes twice the surface area as dot size 2.) And, contrast seen by a capture device between the varnish and the substrate is a measure of the watermark robustness.

We are investigating whether hand-held measurement devices are available, that will provide a measurement correlated to the contrast seen such capture devices in the specular region. If a standard device was available, it could be used to confirm predicted watermark robustness by measuring the relative gloss of reference patches created when a plastic bottle is formed, or relative gloss of printed reference ink/varnish patches. A hand-held gloss meter, GM-268 from M&A Instruments, can be used to obtain a Gloss Value. This GM-268 meter is designed and manufactured in accordance with the standard ASTM D523. The meter comes with a calibration standard which was regularly checked, and the samples were cleaned and placed on a flat surface for measurement. In one test preformed, a "Gloss Value" of each of the patches plus bare substrate and varnish flood was measured. While the gloss meter supports gloss measurements at 20, 60 and 85 degrees, the 85-degree gloss angle setting was used for all measurements to avoid saturation of Gloss Value on shiny substrates like foil.

Figure 14:
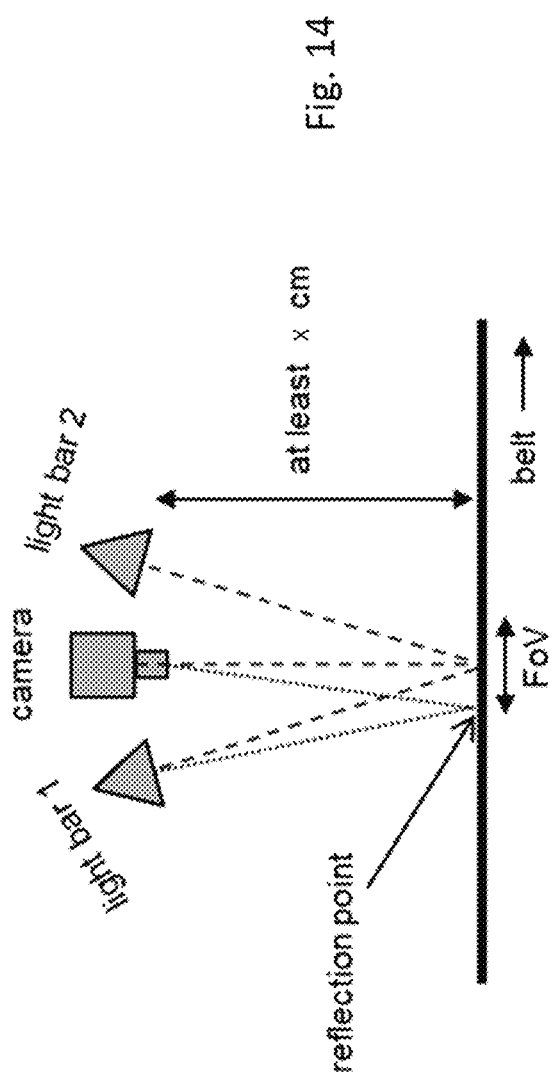
FIG. 14 is a diagram of an image scanner.
Figure 21:
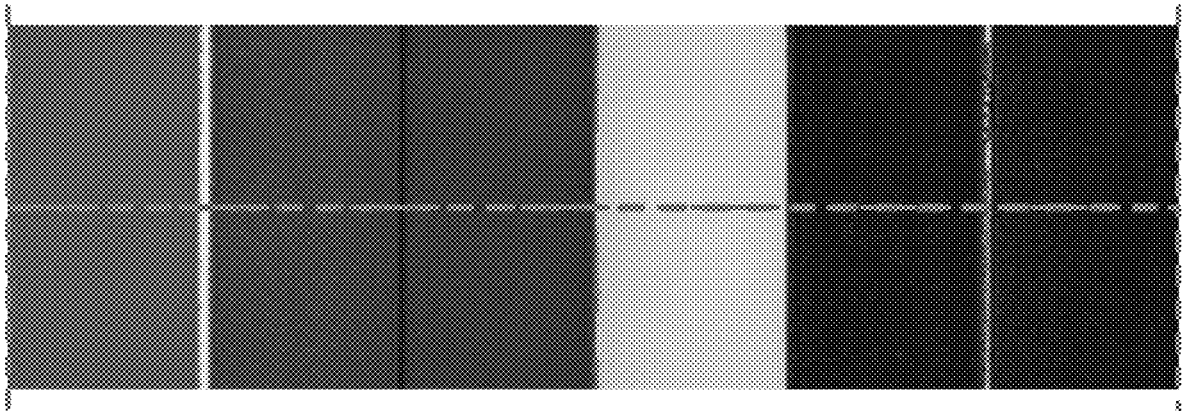
FIG. 21 shows a top row of printed ink, and a bottom row of the printed inks covered with a flood of matte varnish.

FIG. 21 shows 6 inks; the top row includes just a flood of the ink and the bottom row includes a flood of ink covered by a flood of matte varnish. For each patch of ink we measured the Gloss Value at several locations. The measured Gloss Value stayed relatively constant within a patch. We additionally measured contrast of each of the patches using Digimarc Corp's "recycling scanner" as generally modeled in FIG. 14. The scanner includes a monochrome camera, e.g., with a 12-bit output and linear response to captured light, two light bars for illumination and a flat sample bed. The light bars are off-axis to the camera by 10-25 degrees, and light bars contain rows of blue and LED's. The LED's are pulsed on, in sync with the camera system to sequentially capture blue and red frames. The camera and light bars are set to a distance X cm (or inches) above the sample bed for a desired Field of View (FoV). Printed images were captured at the same image location on the recycling scanner. The average gray level with red illumination was measured at the same position in the scan frame. The average gray level of each of the patches plus bare substrate and varnish flood was also measured.

Figure 15:
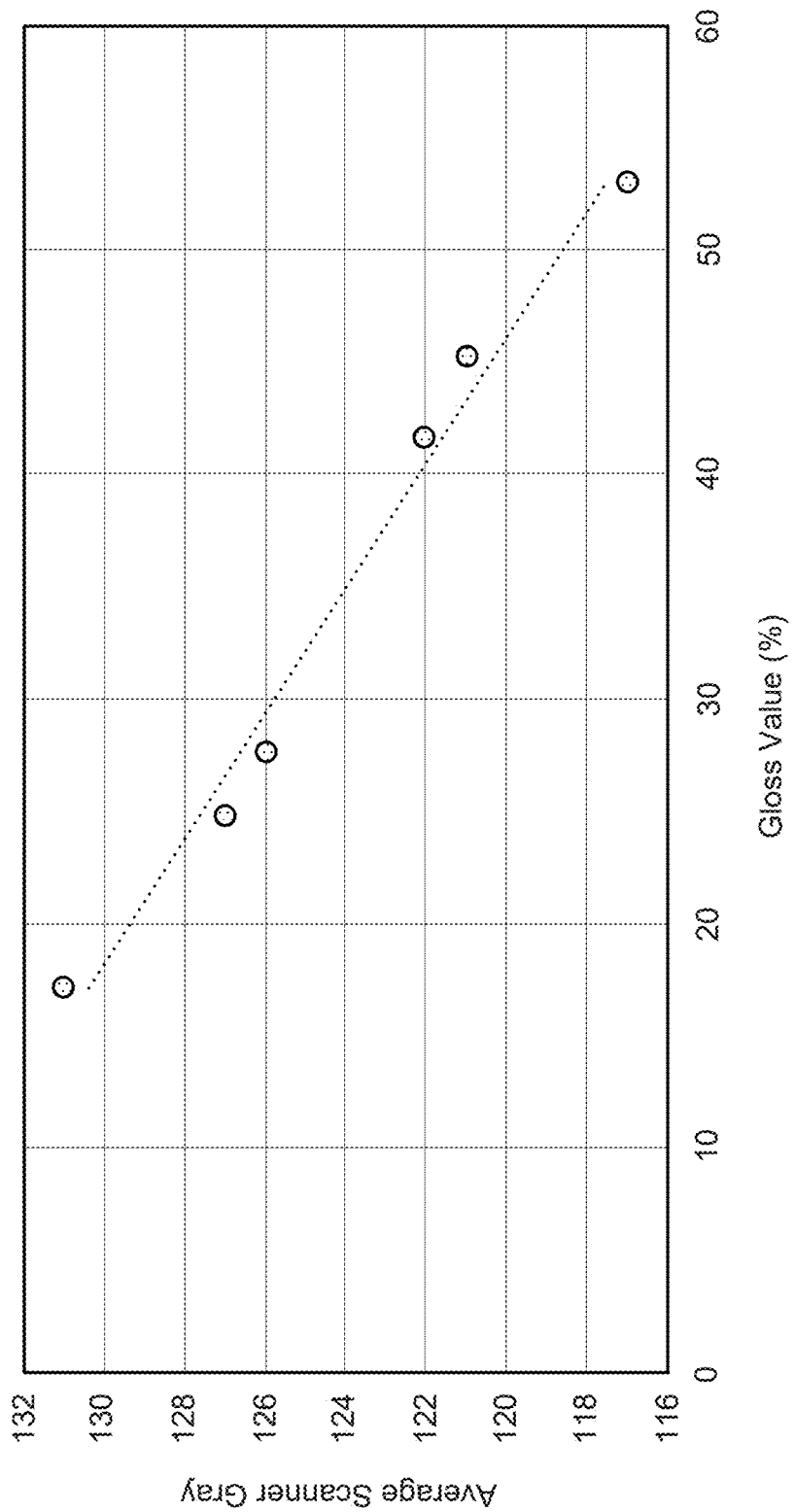
FIG. 15 is a plot showing a relationship between captured scanner grey levels and Gloss Value percentages.

FIG. 15 shows a plot of recycle scanner gray value versus gloss value. There we see that with matte varnish on opaque white plastic substrate, the Gloss Value correlates well with Average Scanner Gray levels in a linear manner. This shows that we compare gloss value to digital watermark robustness, due to a direct relationship between digital or reflectance contrast (e.g., as measured by differences in the scanner gray values or reflectance percentages) and watermark robustness. For example, a higher contrast between a watermark carrier (e.g., cyan ink) and white substrate correlates to a higher signal robustness. Similarly, a lower contrast between a watermark carrier (e.g., yellow ink) and yellow substrate correlated to a lower signal robustness.

Figure 16:
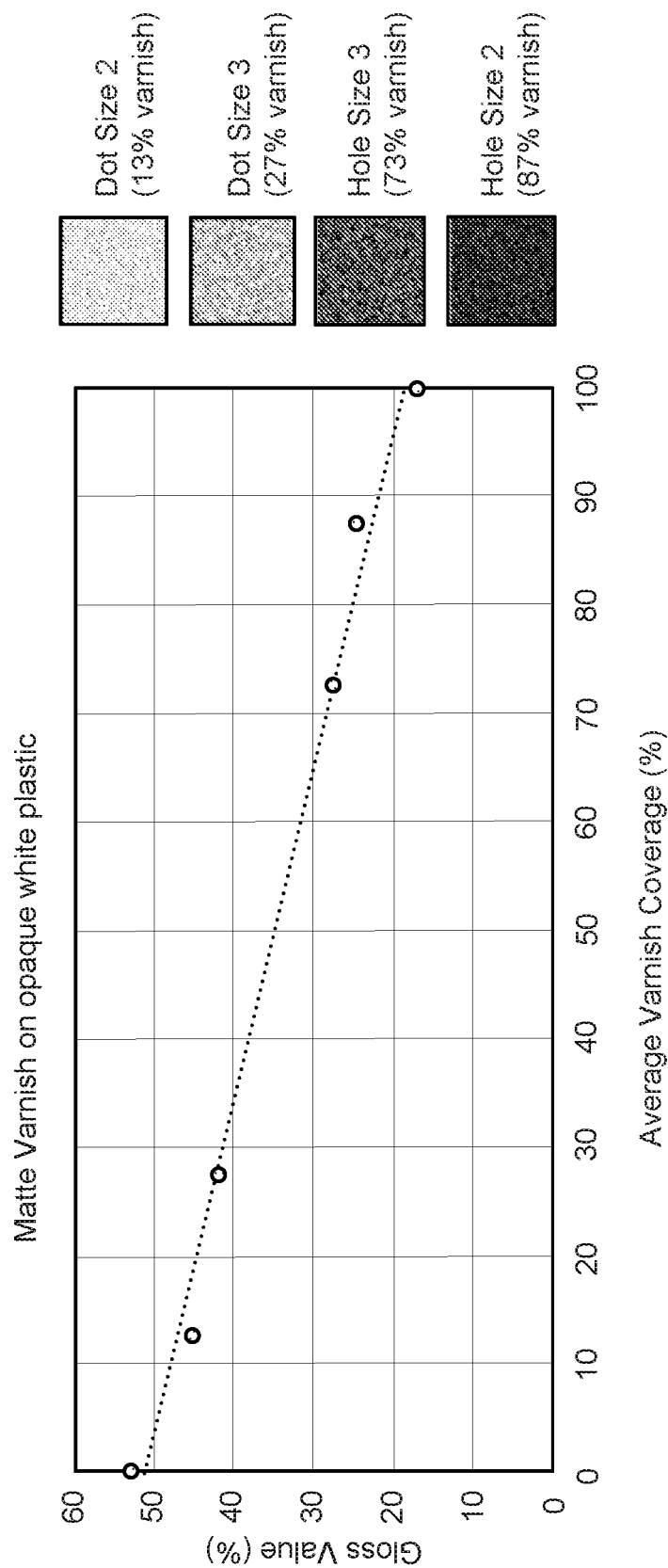
FIG. 16 is a plot showing a relationship between Gloss Value percentages and varnish coverage for a matte varnish on an opaque white plastic substrate.
Figure 17:
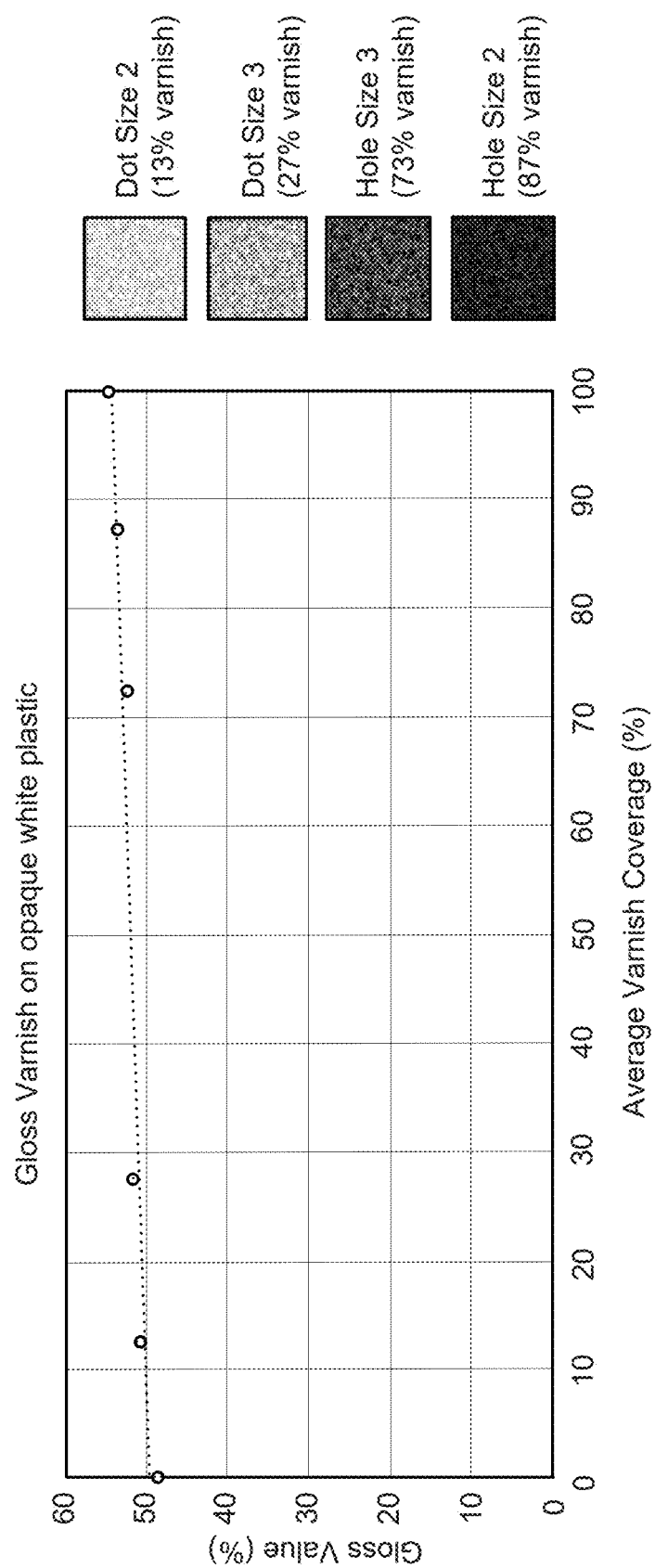
FIG. 17 is plot showing relationships of Gloss Value percentages and varnish coverage for a gloss varnish on an opaque white plastic substrate.

Next, in FIG. 16, we plot Gloss Value vs average matte varnish coverage over an opaque white plastic. 0% varnish in FIG. 16 represents bare substrate (no matte varnish) and 100% varnish is a flood. Different dot and hole sizes have different matte varnish coverage over a substrate (or over gloss varnish layer). Similarly, in FIG. 17 we plot Gloss Value vs average gloss varnish coverage over an opaque white plastic substrate. In particular, different dot and hole sizes have different gloss varnish coverage over a substrate (or over a matt varnish layer).

Figure 18:
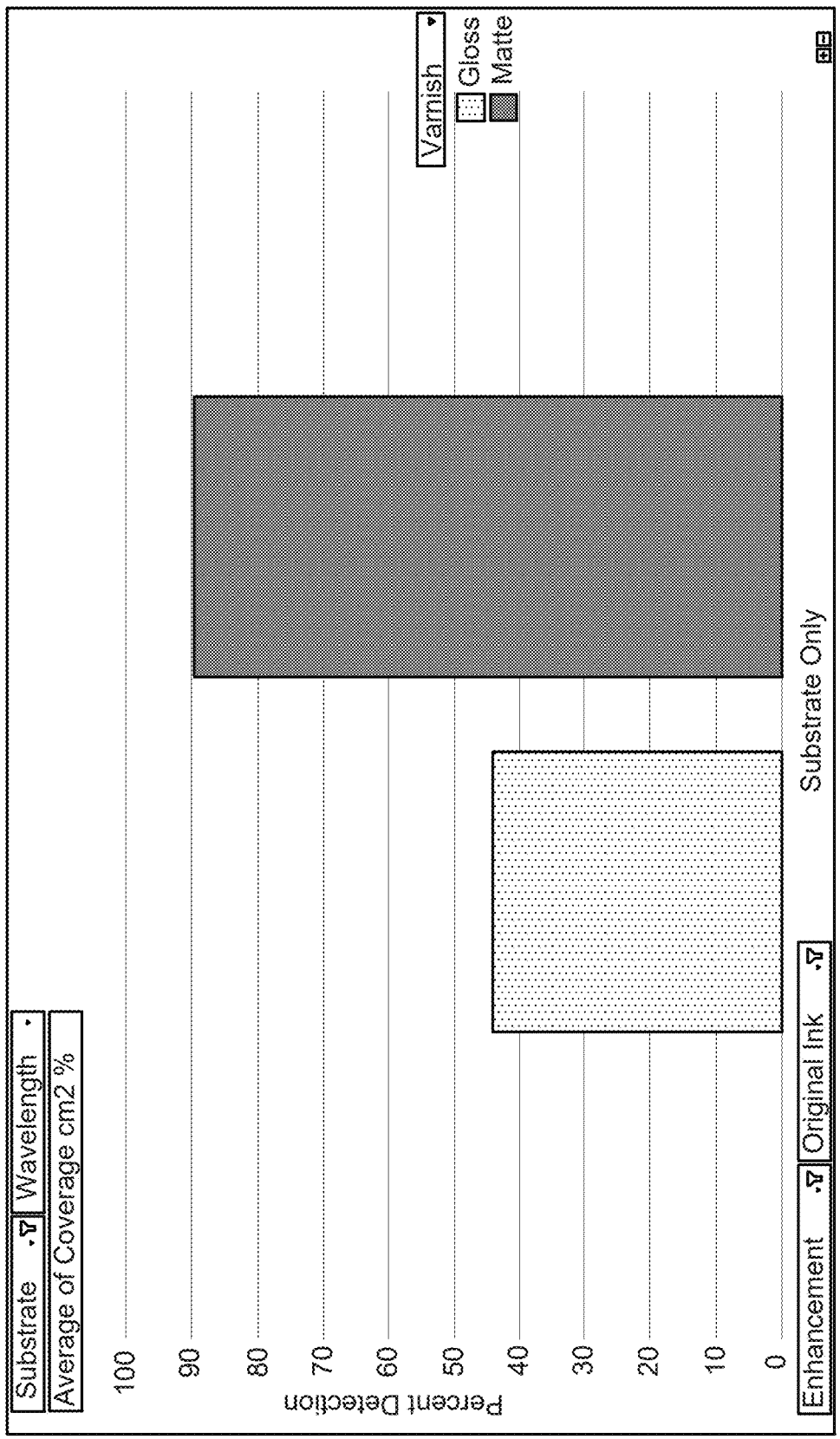
FIG. 18 is a chart showing watermark detection rates for watermark signals carried by matte (right) and gloss (left) varnishes.
Figure 19:
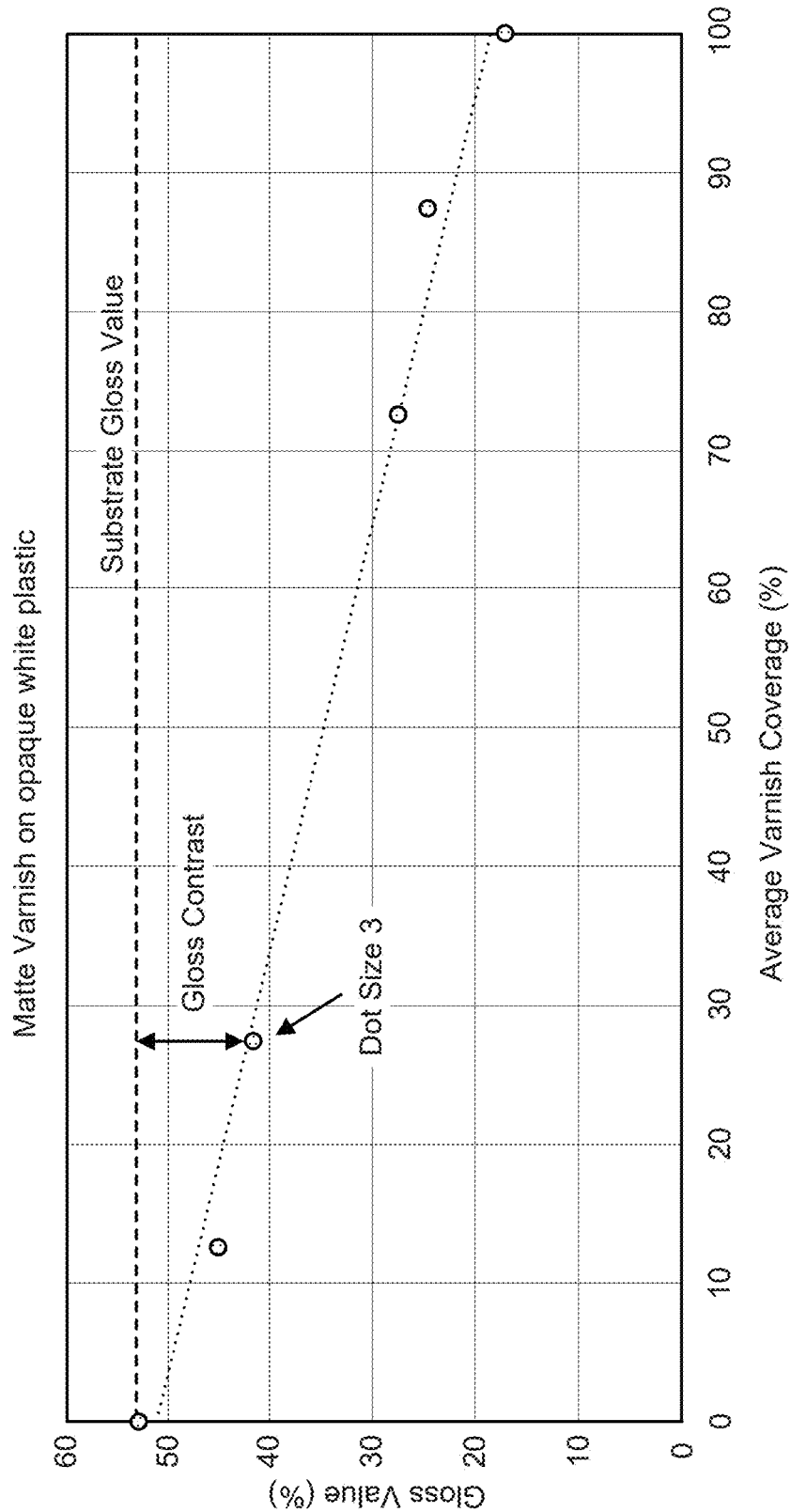
FIG. 19 is plot showing relationships of Gloss Value percentages and varnish coverage for a gloss varnish on an opaque white plastic substrate, particularly at a dot 3 with a 27% coverage rate.

As shown in FIGS. 18 and 19, we've found that matte varnish has a higher gloss contrast on opaque white plastic substrate than the gloss varnish. (FIG. 18 shows watermark robustness carried by gloss and matte varnishes on an opaque white substrate. Robustness values are shown for Dot Size 3; the Y axis is watermark detection percentage; the X axis shows gloss (left bar) and matte (right bar). FIG. 19 shows Gloss Value contrast for matte varnish on an opaque white substrate. At dot size 3, the gloss contrast between the opaque white substate and the matte varnish is about 10-12%.) This results in a higher contrast watermark signal when modulating matte varnish vs. gloss varnish. A higher contrast signal results in greater watermark robustness, and leads to better payload decoding results.

With reference to FIG. 20, several different flood spot colors were overprinted with a matte varnish at 27% coverage. The expected gloss contrast between the substrate and the watermarked sample is an indication of whether the varnish dots were printed correctly. Lower gloss contrast means varnish dots are smaller than expected (or disappeared). Higher gloss contrast means dots are larger than expected.

Thus, we have found that measuring the Gloss Value of a flood of varnish on a substrate relative to a bare substrate is a good indicator of sparse mark robustness for a sparse mark carried by modulating varnish. This measurement can be used to predict signal robustness prior to printing. Additionally, the Gloss Value of the watermark pattern relative to a substrate or color provides a measure for print quality of the varnish dots. The watermark pattern contrast indicates varnish dots are printed correctly.

In another implementation, a watermarking signal that is measured correlates to the local contrast seen by the capture device as described below. The watermarking used for this implementation analyses includes a binary pattern of dots which is like a Frequency Modulated (FM) screening pattern (see FIG. 9). The FIG. 9 watermark signal is carried on a substrate by modulating a varnish applied to the substrate. The varnish is printed so as to include holes spatially arranged according to the illustrated FIG. 9 dots. In some cases, the varnish is printed over an ink, or directly onto a substrate, e.g., a foil.

Figure 9:
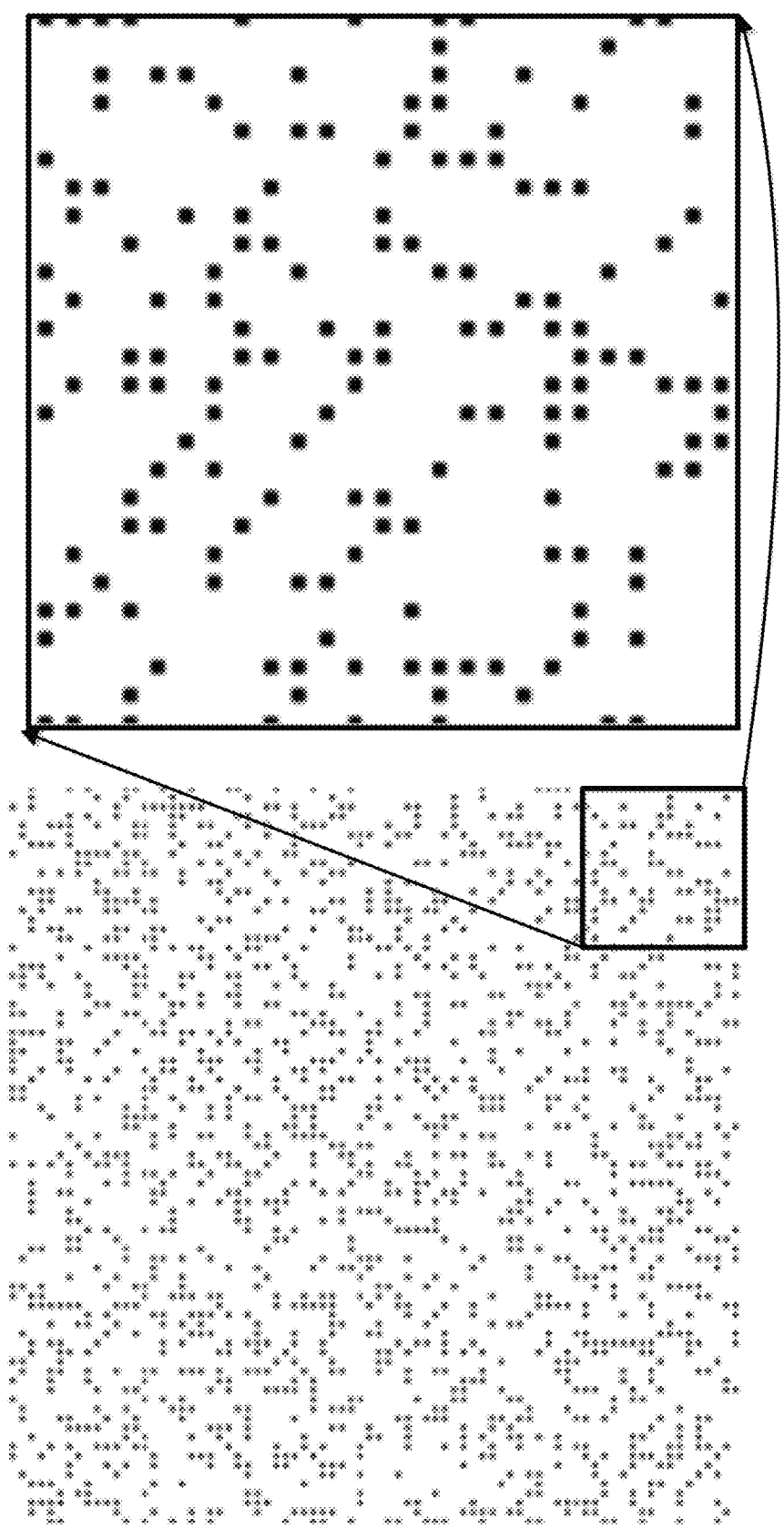
FIG. 9 illustrates one example of a so-called "binary mark" watermark at 150 cells per inch.
Figure 10:
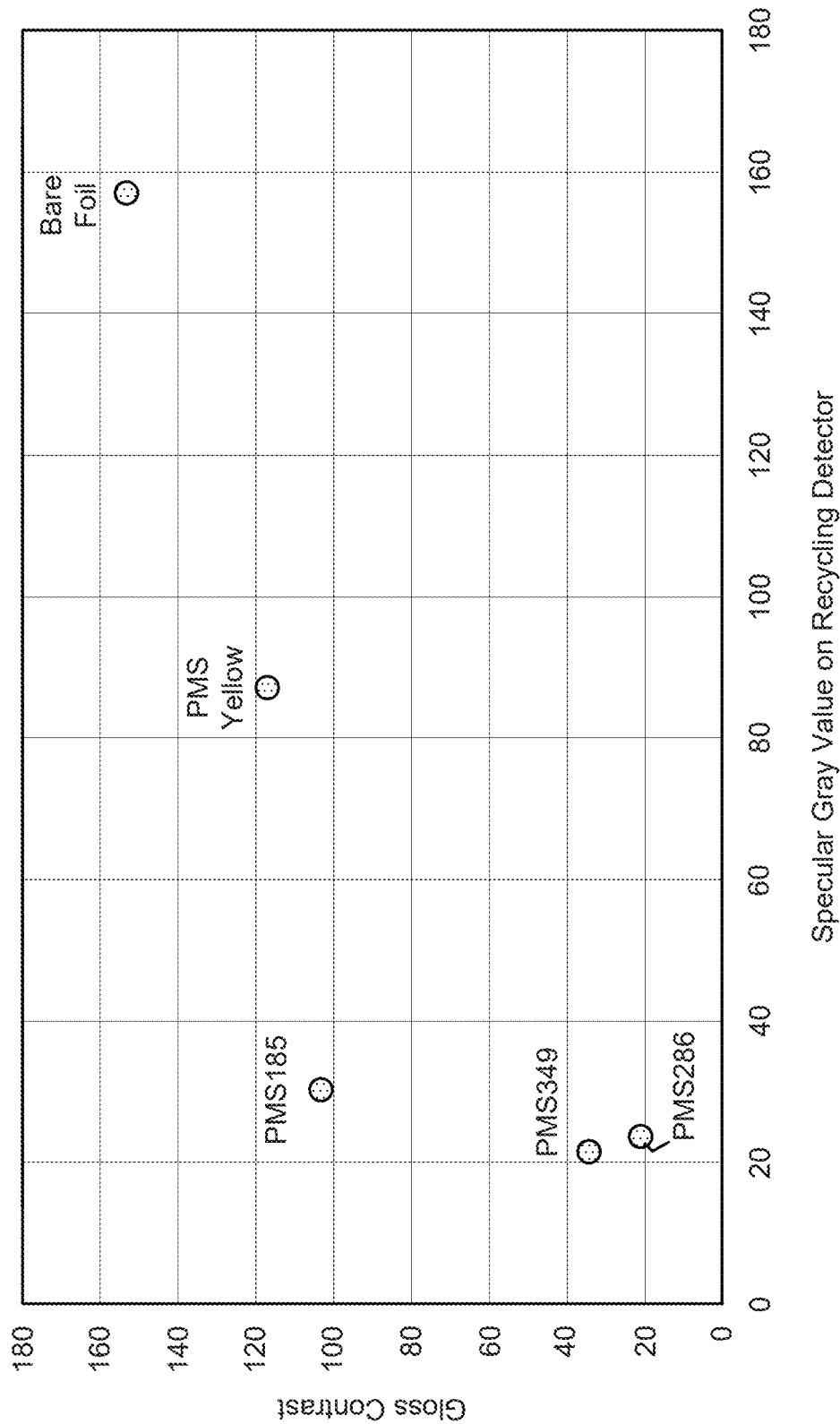
FIG. 10 is a plot of gloss contrast.

A gloss meter averages over a local area defined by the device aperture and measures gray values seen by an ideal capture device. Note that the measurement device aperture needs to be large enough that the pseudo-random watermark signal is averaged out, and the measured gloss value correlates to the gray value seen by a scanner which has a linear response to light (ideal capture device). The minimum aperture size is shown by the dark yellow box in FIG. 9. The gloss value stays approximately constant as the meter is moved to read different regions of a printed piece which has flat image content. Table 2 shows gloss values measured from a piece of bare foil printed with floods of various colors. Column 1 lists the ink colors which are overprinted with a flood of matte varnish (column 3) and compared to a watermarked patch which contains a flood of the same color over-printed with matte varnish that has holes inserted (column 4). Note the black dots in FIG. 9 are the watermark signal that correspond to holes in the flood of matte varnish. Column 5, which is the absolute value of column 4 minus column 3, is the gloss contrast. FIG. 10 is a plot of various contrast values as represented by scanner gray values (e.g., col. 6).

TABLE 2

Measured Gloss Contrast of a Matte Varnish

| INK COLOR | INK (%) | MATTE VARNISH FLOOD (GLOSS VALUE) | BINARY WATERMARK (GLOSS VALUE) | DELTA (GLOSS CONTRAST) | SCANNER GRAY VALUE |
|---|---|---|---|---|---|
| BARE FOIL | 0 | 12 | 169 | 157 | 153 |
| PMS185 | 100 | 12.5 | 42.9 | 30.4 | 103 |
| PMS349 | 100 | 3.6 | 27.5 | 23.9 | 21 |
| PMS286 | 100 | 16 | 37.5 | 21.5 | 34 |
| PMSYELLOW | 100 | 19 | 106 | 87 | 117 |

So the Delta or gloss contrast (column 5) is what a gloss scanner would see from the dots in FIG. 9. If the contrast is sufficient, the watermark will read with sufficient robustness to yield a decodable payload. The contrast is correlated to robustness to determine a predictive model for watermark signal detectability. Moreover, a correlation between gloss contrast and scanner gray value can lead to a prediction of signal robustness from a detected gray value. In Table 2, rows 2 (Bare Foil), 3 (PMS 185) and 6 (PMS Yellow) each have sufficient gloss contrast for signal detection. A threshold at or above say 75-100 grey value could be correlated to allow robustness prediction on a scanned gray level value. (In fact, a much lower gloss contrast allows for prediction, so a lower grey level threshold value could alternatively be used, e.g., above 50, or about 60 or in a range of at or above 50-100.)

III. Operating Environments

The components and operations of the various described embodiments and implementations shown in figures and/or discussed in text above, can be implemented in modules. Notwithstanding any specific discussion of the embodiments set forth herein, the term "module" may refer to software, firmware and/or circuitry configured to perform any of the methods, processes, algorithms, functions or operations described herein. Software may be embodied as a software package, code, instructions, instruction sets, or data recorded on non-transitory computer readable storage mediums. Software instructions for implementing the detailed functionality can be authored by artisans without undue experimentation from the descriptions provided herein, e.g., written in C, C++, Objective-C, and C#, Ruby, MatLab, Visual Basic, Java, Python, Tcl, Perl, Scheme, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hard-wired circuitry, programmable circuitry such as one or more computer processors comprising one or more individual instruction processing cores, parallel processors, multi-core processors, state machine circuitry, or firmware that stores instructions executed by programmable circuitry.

Applicant's work also includes taking the scientific principles and natural laws on which the present technology rests and tying them down in particularly defined implementations. One such realization of such implementations is electronic circuitry that has been custom-designed and manufactured to perform some or all of the component acts, as an application specific integrated circuit (ASIC).

To realize such implementations, some or all of the technology is first implemented using a general purpose computer, using software such as MatLab (from Math Works, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

The methods, processes, components, technology, apparatus and systems described above may be implemented in hardware, software or a combination of hardware and software. For example, the color managed embedding and optimizations may be implemented in software, firmware, hardware, combinations of software, firmware and hardware, a programmable computer, electronic processing circuitry, digital signal processors (DSP), FPGAs, graphic processing units (GPUs), a programmable computer, electronic processing circuitry, and/or by executing software or instructions with a one or more processors including parallel processors, one or more multi-core processor(s) and/or other multi-processor configurations.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The particular combinations of elements and features in the above-detailed embodiments are exemplary only; the interchanging and substitution of these teachings with other teachings in this and the incorporated-by-reference patents and documents are also contemplated.

What is claimed is:

1. An image processing method comprising:
   obtaining a first gloss value corresponding to a layer comprising a matte or gloss topcoat flooded over a substrate or color;
   obtaining a second gloss value corresponding to the substrate or color;
   determining a relationship between the first gloss value and the second gloss value to determine signal robustness of a sparse mark signal pattern provided on the substrate or color with the matte or gloss topcoat.

2. An image processing method comprising:
   obtaining a gloss value corresponding to a sparse mark pattern relative to a substrate or color, the sparse mark pattern printed on a substrate using a matte or gloss topcoat, the sparse mark pattern comprising a plurality of printed dots;
   using the gloss value to determine whether the plurality of printed dots are printed correctly.

3. An image processing method comprising:
   for each of a plurality of substrates or colors, obtaining a first gloss value corresponding to a layer comprising a matte or gloss topcoat flooded over a substrate or color;
   for each of the plurality of substrates or colors, obtaining a second gloss value corresponding to the substrate or color;
   for each of the plurality of substrates or colors, determining a gray level for the layer comprising a matte or gloss topcoat flooded over a substrate or color; and
   determining a relationship between the first gloss values and the second gloss values and determined gray levels to predict signal robustness of a sparse mark signal pattern provided on a substrate or color with the matte or gloss topcoat.

* * * * *